Sept. 28, 1937.　　M. L. NELSON ET AL　　2,094,133
DISPLAY SYSTEM
Original Filed March 23, 1934　　7 Sheets-Sheet 1

INVENTOR.
MARTIN L. NELSON
LEITH JOHNSTON.
BY
ATTORNEY.

Sept. 28, 1937.  M. L. NELSON ET AL  2,094,133
DISPLAY SYSTEM
Original Filed March 23, 1934    7 Sheets-Sheet 3

INVENTORS
MARTIN L. NELSON
LEITH JOHNSTON
BY
ATTORNEY.

Sept. 28, 1937.                M. L. NELSON ET AL                2,094,133
                                  DISPLAY SYSTEM
                    Original Filed March 23, 1934    7 Sheets-Sheet 4
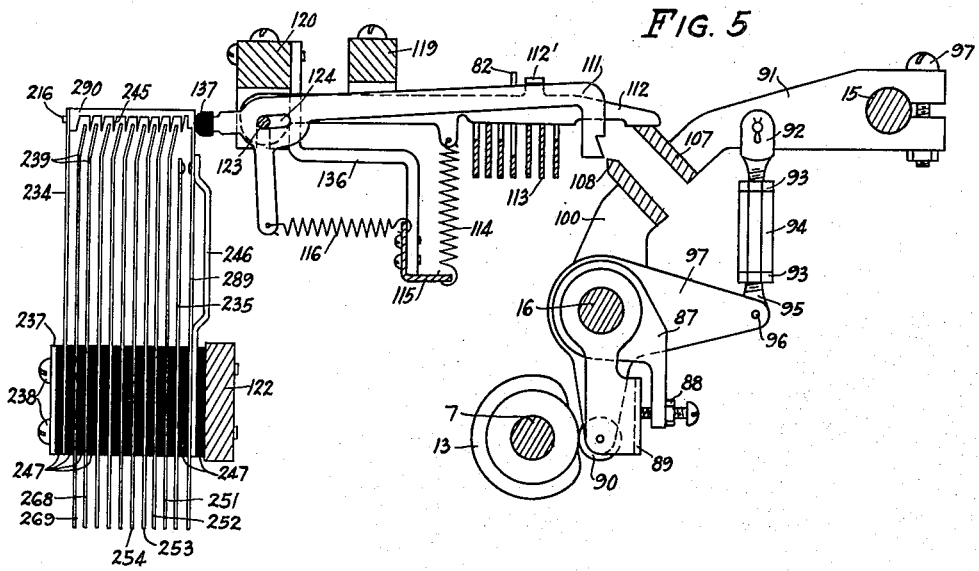
FIG. 5
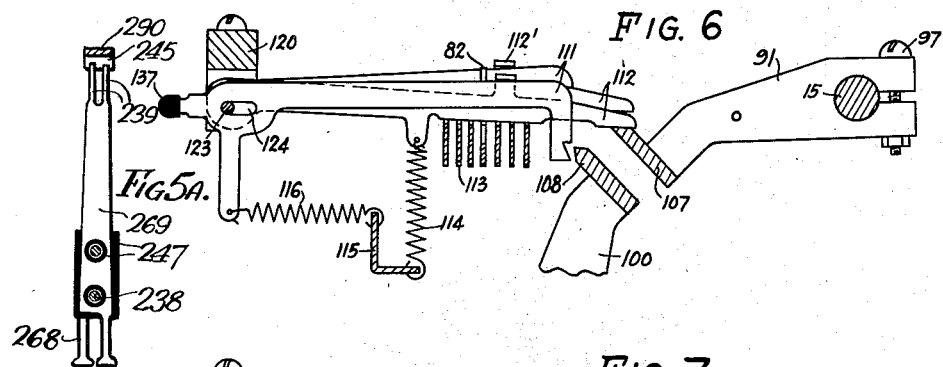
FIG. 6
FIG. 5A.
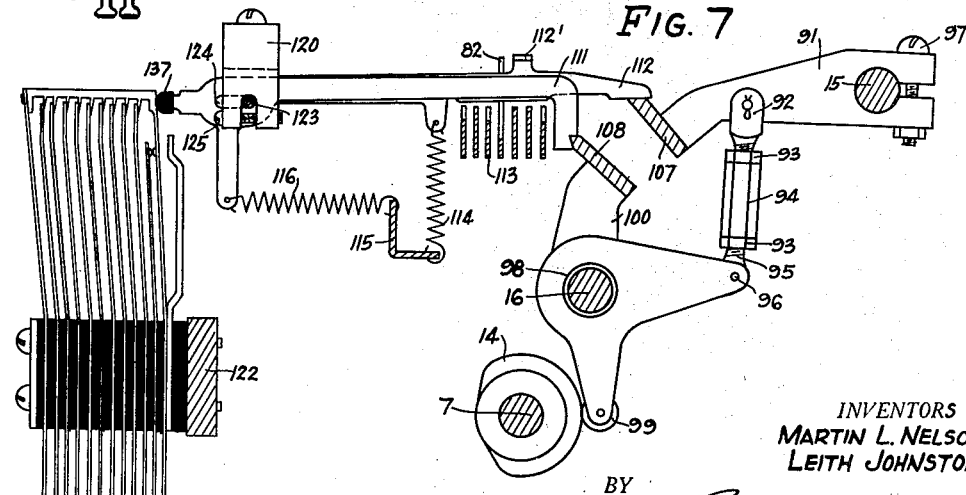
FIG. 7
INVENTORS
MARTIN L. NELSON
LEITH JOHNSTON
BY
ATTORNEY.

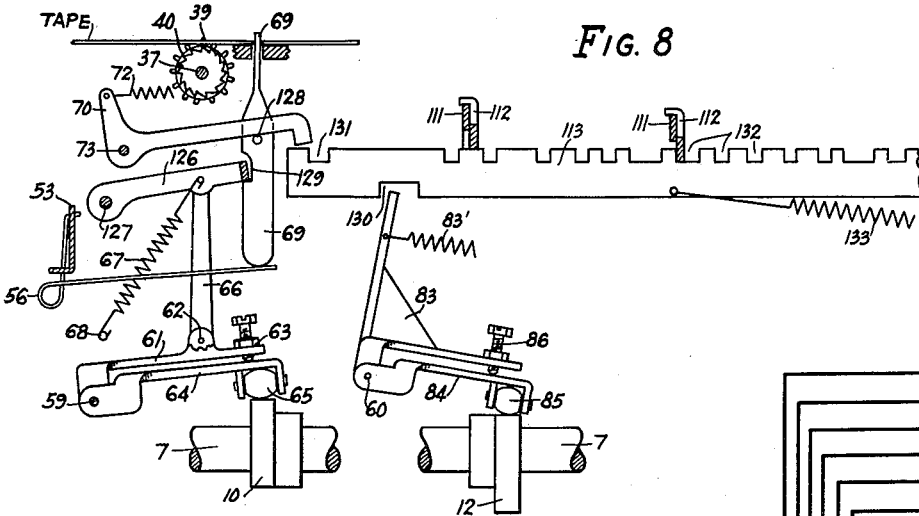

Sept. 28, 1937.    M. L. NELSON ET AL    2,094,133
DISPLAY SYSTEM
Original Filed March 23, 1934    7 Sheets-Sheet 6

Fig. 11

INVENTORS
MARTIN L. NELSON
LEITH JOHNSTON
BY
    Chas. W. Candy
        ATTORNEY.

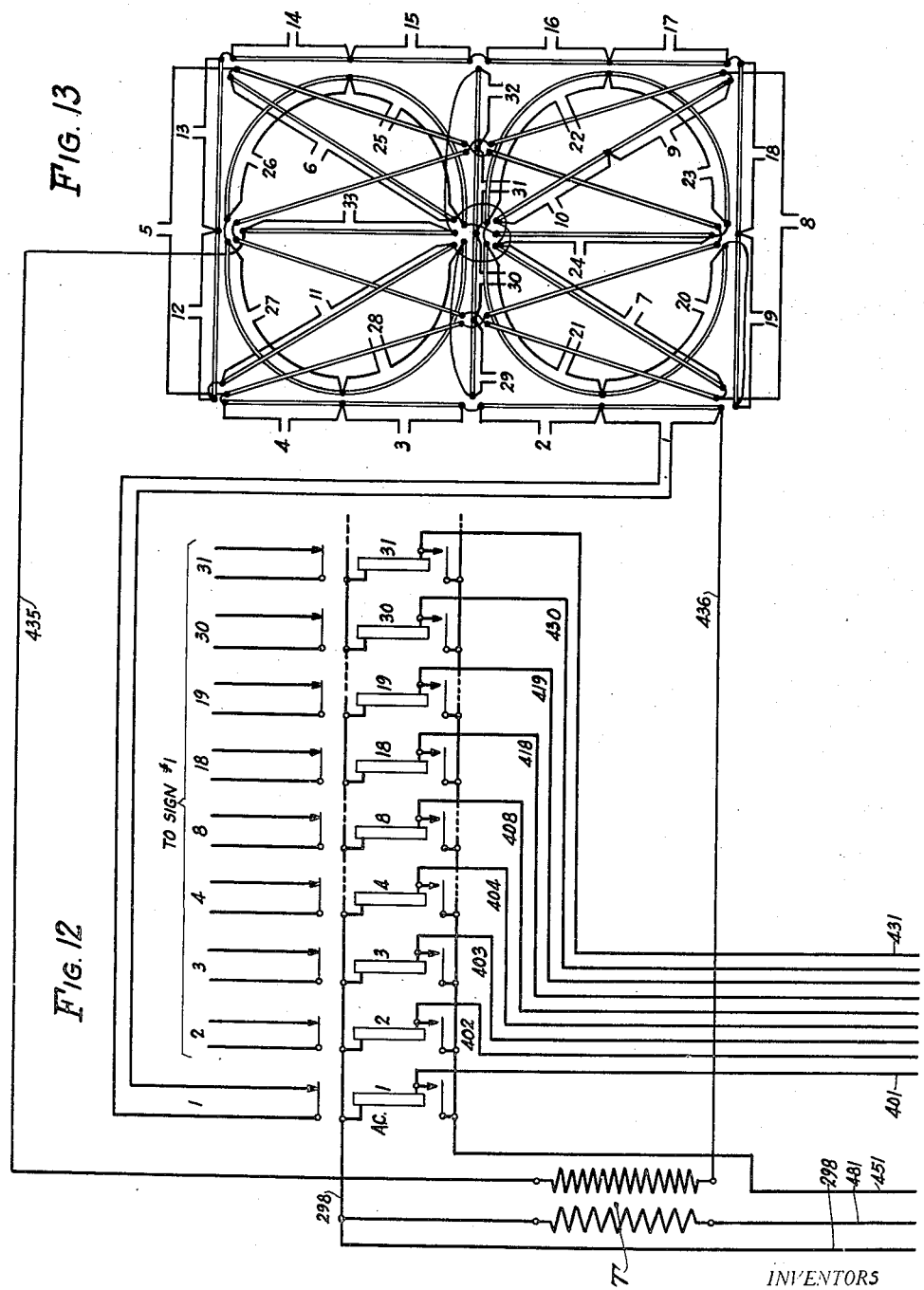

Patented Sept. 28, 1937

2,094,133

UNITED STATES PATENT OFFICE 2,094,133

DISPLAY SYSTEM

Martin L. Nelson, Park Ridge, Ill., and Leith Johnston, Providence, R. I., assignors to Associated Electric Laboratories, Inc., Chicago, Ill., a corporation of Delaware Original application March 23, 1934, Serial No. 716,980. Divided and this application November 22, 1935, Serial No. 51,052

6 Claims. (Cl. 177—350)

This invention relates in general to improvements in electrically illuminated display systems.

The main object of the present invention relates to the control of a new and novel electric display sign by a tape translator operated in accordance with coded perforations in a pre-punched tape.

The present application is a division of prior application Ser. No. 716,980, filed March 23, 1934 wherein the mechanical construction and operation of the tape translator is being claimed.

Referring now to the drawings comprising Figs. 1 to 8, inclusive, there are shown different views and details of the tape translator, while Fig. 9 shows a portion of the tape for controlling the tape translator. Figs. 10, 11, 12, and 13 diagrammatically disclose circuits controlled by the tape translator for displaying words or characters on an electric illuminated sign.

Figure 1:
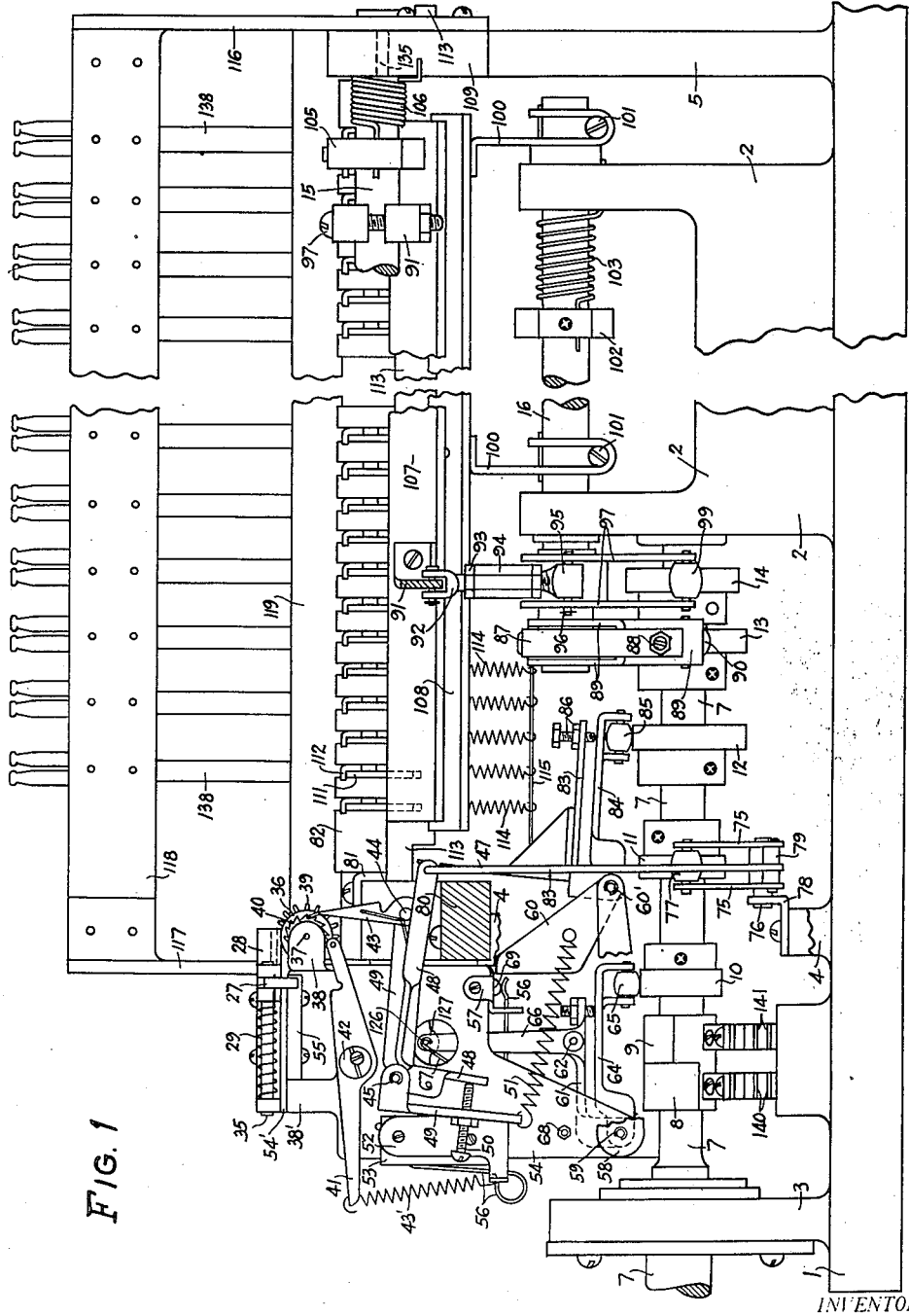
Fig. 1 shows a side view of the tape translator with certain parts thereof removed to more clearly disclose the mechanism.

Figs. 5, 6, and 7 are partial cross sections to more clearly show the operations of the selector bars, push bars, code bars, and the selector bar and push bar bails.

Fig. 5A shows a cross section of the contact spring assembly.

Fig. 8 shows the detail mechanism by which the feeler pins and code bars are controlled.

Fig. 9 shows a portion of the perforated tape for controlling the translator.

Fig. 10 shows some of the push bars of the translator with their associated spring combinations for controlling certain sign circuits. A start and a stop key for controlling the translator stop magnet is also shown.

Fig. 11 shows a step-by-step sequence switch SQ and a portion of the circuits for controlling the sign.

Fig. 12 shows a transformer and the A. C. relays of an individual sign frame or letter box.

Fig. 13 diagrammatically shows the arrangement of the neon tube sections of one of the sign frames or letter boxes.

Referring now in detail to Figs. 1 to 8, inclusive, a general description of the tape translator will first be given. The cam shaft of the tape translator is rotated by means of a small motor and a mechanically controlled clutch. The translator mechanism is controlled by cams on the cam shaft and by a tape. A star wheel feeds the tape one step with each cycle of operation of the cam shaft and positions the tape in its rest positions so that the perforations therein are directly over the feeler pins. These feeler pins have individual springs to force them against the tape, but they are held from doing so by a bail with stronger spring tension. This bail is removed by a cam on the cam shaft which raises the bail and allows the feeler pins to press against the tape or to pass through the perforations in the tape. Associated with each feeler pin is a code bar latch which is removed by the feeler pin in case the pin extends through a perforation in the tape. There are six permutation code bars, one for each code bar latch. The bars are normally held in position behind the code bar latches by a cam operated code bar bail. When the feeler pins have moved their full distance, the code bar bail moves so as to permit the movement of the code bars. The code bars are either held by their individual latches or move a definite distance dependent upon the position of their individual latches.

The code bars have notches cut in them so that for each given code combination certain notches in all bars will be in alinement. Directly above these notches are selector bars and push bars, the downward movement of the latter being controlled by their associated selector bars. The selector bars are normally held off the code bars by a cam operated selector bar bail, but as soon as the code bars have been allowed to move the selector bar bail allows all the selector bars to fall against the code bars. Assuming that a particular code has been selected and certain of the code bars have moved, the code bars will have one series of notches in alinement and the selector bar above these notches will drop into the alined notches and carry the associated push bar with it. A cam operated push bar bail then moves and engages only the push bar that dropped with the selected selector bar. The push bar bail pushes the selected push bar to close associated contact springs located at its opposite end. As soon as the push bar bail engages the selected push bar the same is held in engagement therewith and the selector bar bail may now restore the selector bars. The code bar bail now restores the code bars for a new selection while the selected push bar is being held and operated by the push bar bail.

As soon as the code bars have moved to their selecting positions, the feeler pins are restored to normal by the feeler pin bail, and the tape feed pawl is operated by a cam to position the tape for the next selection.

Figure 3:
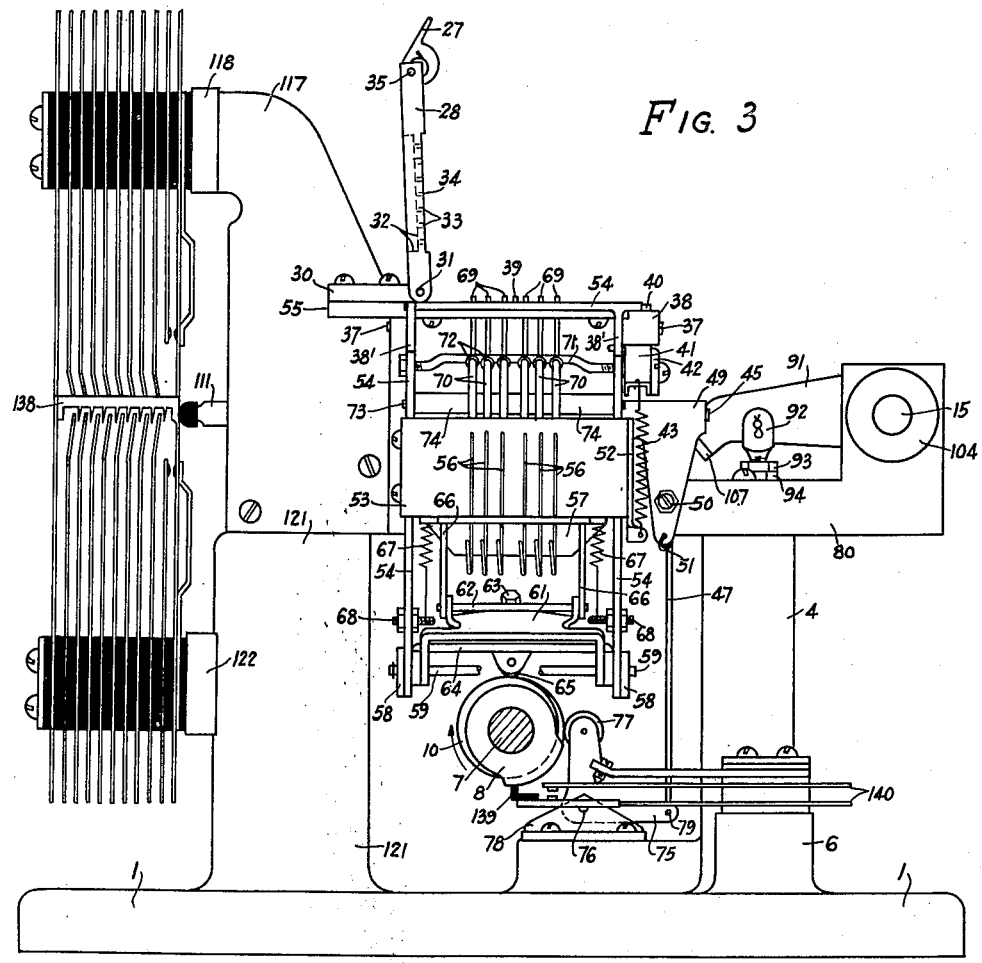
Fig. 3 shows an end view with the tape cover in an upright position.
Figure 4:
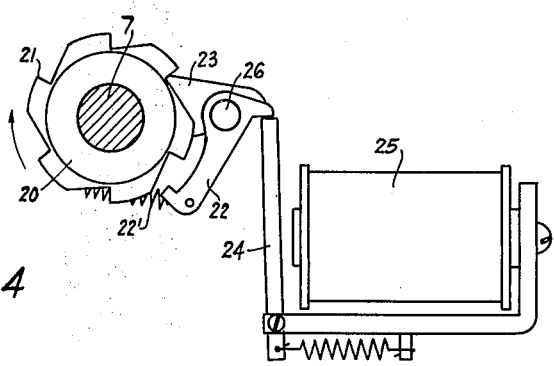
Fig. 4 shows the stop magnet and clutch mechanism for operatively connecting the cam shaft 7 to the drive shaft 17.

The base assembly in the translator comprises a base 1 having upright supports for mounting the various parts. Support 2, integral with base 1, comprises a bearing support for the cam shaft 7 and a bearing support for the shaft 16. The cam shaft 7 is supported at its left end by the bearing support 3. Spring assemblies 140 and 141 are mounted on support 6 in the manner shown in Fig. 3. Upright supports 4, 5, 121 and a support similar to 121 (not shown) is provided for mounting the selector and code bar assembly to the base assembly. A bracket 78 mounted on support 4, Figs. 1 and 3, is provided to enable the bell crank levers 75 to rotate on the pivot 76. Roller 77, rotatably mounted between the levers 75, engages the raised and lowered portions of the tape feed cam 11 mounted on the cam shaft 7. The cam shaft 7 has a plurality of cams thereon which operate different parts in certain timed relation with respect to its rotation. Cams 8 and 9 operate the spring assemblies 140 and 141, cam 10 controls the operation of the feeler pin bail 126, and cam 12 controls the operation of the code bar bail 83. Cam 13 engages a push bar bail cam follower comprising a U-shaped lever 78 loosely mounted on shaft 16 and having turned down edges in which the roller 90 rotates, see Figs. 1 and 5. The associated adjusting arm 87 is rigidly mounted to shaft 16 and has an adjusting nut and screw assembly 88 which may be adjusted with respect to the lever 89 so as to rotate the shaft 16 when the high part of cam 13 engages roller 90. Cam 14 engages the roller 99 which is rotatably mounted between two bell crank shaped arms 97 which are rotatably mounted on the shaft 16. A lug adjusting screw 95 is pivotally mounted at 96 between the two arms 97. Two lock nuts 93 and an adjusting nut 94 operatively connect the lug adjusting screw 95 to the lug adjusting screw 92 which is pivotally connected to the selector bar bail arm 91. Keyed to the shaft 16 for oscillation therewith are two U-shaped arms 100 securely held by bolts 101. A push bar bail 108 is rigidly secured to the bent ears of the arms 100 so that when the shaft 16 is oscillated by the cam 13 bail 108 is oscillated therewith. A spring 103 having one end extending through the support 2 and the other end extending through an adjusting nut 102 on shaft 16 is tensioned to hold the roller 90 on the surface of cam 13.

A U-shaped stop arm 23 is keyed and rigidly connected to shaft 7 (Fig. 2) and normally engages the stop armature 24 of stop magnet 25 which is fastened to the base 1 by means of a bracket (not shown). A pawl 22 pivoted at 26 to stop arm 23 also normally engages the stop arm 24 to disengage the catch of the pawl from the teeth 21 of clutch 20, see Fig. 4. When the stop armature 24 is attracted by the magnet 25 the arm 23 and pawl 22 are released and a spring 22' draws the catch of pawl 22 into engagement with a tooth 21 on clutch 20. The clutch 20 now rotates the cam shaft 7 by means of the fiber gears 19 and 18. A small motor (not shown) drives the shaft 17 on which is mounted the gear 18 which is in mesh with the gear 19 on clutch 20. As long as the pawl 22 is out of engagement with the teeth 21 of clutch 20 the cam shaft 7 is not operated, but as soon as the pawl 22 engages a tooth on the clutch then the cam shaft is rotated with clutch 20.

The selector and code bar assembly comprise end pieces 80 and 109 which are secured to the upright supports 4, 5, 121 and a similar support by means of machine screws. The end pieces 80 and 109 each have holes in the L-shaped portion towards the front of the assembly in which the shaft 15 is oscillated. Two lugs 104 on shaft 15 on either side of piece 80 prevent longitudinal movement of shaft 15. Two U-shaped arms 91 are keyed to shaft 15 by means of key 91' and held in place by machine screws and nuts 97. A common selector bar bail 107 is rigidly secured to the bent ears of the arms 91 to raise and lower the selector bars 112 in response to the oscillations of shaft 15, the shaft 15 being oscillated by means of the cam 14, roller 99, arms 97, and the adjustable links 92, 93, 94, 95 connecting the arms 97 to the arm 91 (Fig. 7). A notched bar 120 toward the rear of the assembly is secured to the pieces 80 and 109 by means of machine screws. The notches in bar 120 are large enough to allow both the selector bars 112 and push bars 111 to move freely therein as more clearly shown in Figs. 5, 6, and 7. A slot extending longitudinally through the bar 120 is provided for the rod 123 which is held in place by screws 125. Each selector bar 112 has an opening through which the rod 123 extends to form a pivot for the selector bars. A spring 114 is provided for each selector bar 112 to cause the selector bar to be held against the selector bail 107 or to rest on the code bars 113 dependent upon the position of bail 107. The springs 114 are fastened to the selector bars 112 near their center and to the angle piece 115 which is rigidly connected to bar 120 by means of the brackets 136. Each selector bar 112 has an upward extending and turned over portion 112' for controlling the downward movement of its associated push bar 111. Each push bar 111 has an elongated opening 124 through which the bar 123 extends and a downward extending arm to which its individual restoring spring 116 is attached. The front end of each push bar 111 curves down and has a triangular notch therein in which the point of the push bar bail 108 enters to operate and hold the push bar. The rear end of each push bar 111 is provided with a hard rubber bushing 137 for controlling springs, a lever for operating keys of a typewriter, or other apparatus as the case may be. The elongated holes 124 in each push bar 111 are provided to allow longitudinal as well as lateral movement of the push bars in the slots in bar 120. Each push bar 111 is held by its individual spring 116 against the rod 123 and against the turned edge 112' of its associated selector bar 112 as shown in Figs. 5 and 6. However, when certain notches in the code bars 113 are in alinement one of the selector bars 112 is pulled into these alined notches by its individual spring 114 when the selector bar bail 107 is lowered by shaft 15. The edge 112' on this particular selector bar pulls the associated push bar 111 down a sufficient distance, as shown in Fig. 6, to permit the bail 108 to engage the notch in the push bar and operate the same when the push bar bail 108 is operated, as shown in Fig. 7.

The end pieces 80 and 109 have slots therein in which the code bars 113 move longitudinally. The code bars 113, as is well known, have notches 132 therein which are alined for different codes dependent upon the combination of code bars actuated. Notches 132 are so arranged on the code bars 113 that for each different combination of actuated code bars 113 a different series of notches are in alinement for allowing different selector bars 112 to drop in such alined notches when the bail 107 is lowered. A combed guide piece 82 extending longitudinally between the code bars 113 is provided so that the selector bars 112 and push bars 111 will be maintained in their proper positions with respect to the notches in the code bars 113. Each code bar 113 has an individual spring 133 normally tensioned to move the bar to the right so that a raised portion on the bar rests against the stop piece 135 mounted on piece 109 (Fig. 2) when the code bar is in actuated position. Each code bar 113 has a notch 130 by means of which the code bar bail 83 moves and holds the code bars 113 to the left (Fig. 9) when the roller 85 is on the high part of cam 12. Each code bar 113 has a notch 131 in its upper left-hand edge in which its individual latch 70 drops when the code bar bail 83 has moved to the left and when the corresponding feeler pin 69 is not extending through a perforation in the tape. The latches 70 in notches 131 hold the code bars 113 from movement only when the bail 83 is in the position shown in Fig. 8 and then only in case the lugs 128 on feeler pins 69 have not raised the latches 70 due to the feeler pins extending through the tape. A plate 81 mounted on piece 80 allows longitudinal movement of the code bars in the slots in piece 80 while preventing vertical movement thereof. A bar 119 extending across the top of the selector bars 112 is secured to the end pieces 80 and 109 by machine screws. End brackets 116 and 117 secured to the end pieces 109 and 80, respectively, by machine screws are provided to enable the upper spring assemblies on bar 118 to be mounted thereon. The lower spring assemblies on bar 122 are mounted on the support 121 and a similar support at the other end of the translator.

The selection head assembly comprises a box shaped frame 54 made from a punched blank in which the sides have been bent at right angles to the front side which is attached to the end piece 80 by machine screws. The two bent sides of frame 54 have lugs 38' extending upward therefrom to which a portion 54', bent at right angles to the front side, is welded to form a top for the frame 54. Feeler pin holes are drilled through this top portion 54' to guide the feeler pins 69. The ears 38 are also bent from the front side of frame 54 and provide bearing supports having holes in which the tape feed wheel 36 rotates on its shaft 37. The extensions 60 are also bent from the front side of frame 54 to provide bearing supports for the bail 83 and its associated cam follower lever 84, both of which rotate on the rod 60' extending between the right and left-hand extensions 60. The cam follower 64 and associated bail lever 61 both rotate on the rod 59 which extends through holes in the lower side portions of frame 54. A rod 45 is riveted to the right-hand side of frame 54 on which both the pawl actuating lever 49 and cam controlled tape feed lever 48 rotate. The pawl 43 is pivoted on lever 49 and is normally held by a spring against the teeth 40 cut in the tape wheel 36. An adjusting nut and screw assembly 50 is provided for adjusting the stroke of pawl 43 with respect to the cam actuated tape feed lever 48. A spring 51 is normally tensioned to rotate lever 49 on the rod to raise the pawl 43 whenever the lever 48 is raised by the connecting link 47 connecting the lever 48 to the feed cam follower assembly which is operated by the tape feed cam 11. The spring 51 likewise holds the roller 77 in engagement with cam 11 at all times. The detent lever 41 is adjustably mounted on the side of frame 54 and the detent is set to rest in between teeth 40 in order to properly aline the star wheel sprockets 39 of the tape wheel 36 so that the tape is always positioned in its stop positions with the perforations in the tape directly over the feeler pin holes in top 54'. A spring 63' fastened to one end of detent lever 41 normally holds the detent between two adjacent teeth 40 on the tape wheel 36. The other end of spring 53' is fastened to a bracket 52 on frame 54. A U-shaped end plate 53 fastened to both sides of frame 54 is provided with holes through which the individual feeler pin springs 56 extend. A comb 57 connected to both sides of frame 54 is provided with a slot for each feeler pin 69 and each spring 56 to act as guides therefor. The cam follower 64 has a roller 65 always resting against the surface of the feeler pin cam 10 and the adjusting nut and screw 63 maintains the proper relation between the bail lever 61 and cam follower 64. Two levers 66 rotatably fastened at 62 to the two turned up ears on bail lever 61 are also rotatably fastened to a U-shaped bail 126 which is pivoted at 127 in the frame 54. The free end of bail 127 (shown in cross-section in Fig. 8) rests in the cut-out notches 129 in each of the feeler pins 69. Springs 67 are of sufficient strength to overcome the tension of springs 56 with the result that spring 67 always maintains the roller 65 in engagement with cam 10. The bail 126 holds the feeler pins 69 down below the tape when roller 65 is on the low surface of cam 10 and when the cam 10 raises the bail 126 the feeler pins 69, due to the tension of their individual springs 56, either engage the tape or pass through a perforation therein as the case may be. Due to the curvature of the cam 10 the pins 69 are gradually raised to prevent the pins 69 from perforating the tape if no hole is encountered. Each feeler pin 69 has a lug 128 which raises its corresponding latch 70 whenever such pin extends through a perforation in the tape. In case the feeler pin 69 engages a non-perforated space in the tape the pin will not rise a sufficient distance to withdraw the latch 70 from notch 131 in its corresponding code bar 113. The latches 70 rotate on a rod 73 extending between the two sides of frame 54. Spacing washers 74 hold the latches 70 in the proper positions on the rod 73. Each latch 70 has an individual spring 72, slightly weaker than spring 56, which cause the latches to enter the notch 131 when the feeler pins 69 are down. The latch springs 72 are connected to rod 71 extending between the two sides of frame 54.

A tape cover 28, rotatably mounted on a rod 31 extending through plate 30, has a grooved portion indicated at 32, and holes 33 for guiding the feeler pins 69. A slot 34 in cover 28 allows the star wheel sprockets 39 of tape wheel 36 to rotate without interference. The cover catch 27 rotatably mounted on rod 37 is normally held in the position shown in Figs. 1 and 2 by the spring 29.

Figure 2:
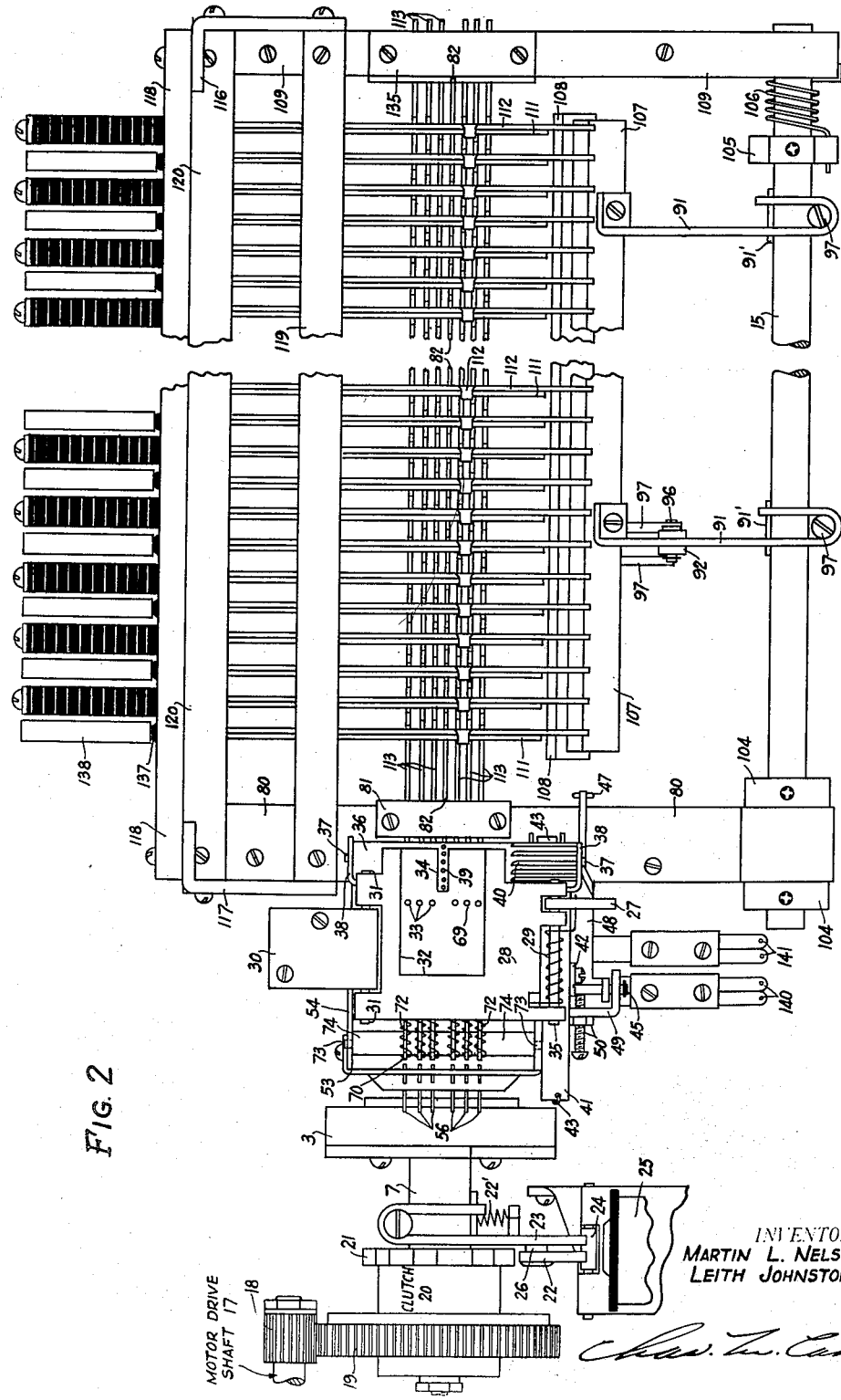
Fig. 2 shows a top view.

The novel spring assembly shown mounted on bar 122 in Figs. 5 and 6 will now be described in detail. The spring assembly comprises a plurality of similar shaped springs 269, 268, 254, 253, and 252 separated by insulators 247. Each spring, such as springs 269 or 252, is bent at an angle, as indicated at 239. The upper portion of each such spring as shown in Fig. 5A is split in the middle in order for each spring to make two rubbing contacts with its associated tooth 245 on top piece 290. Each spring has two holes through which raised portions of the insulators 247 extend and each insulator has two holes in the center of the raised portions through which the machine screws 238 pass for securing the assembly to bar 122. Due to the raised portions of the insulators 247 the assembly is insulated from the screws 238 and bar 122. An insulator 247 separates the back stop 246 from bar 122 and next to this back stop 246 is mounted the flat spring 289 which is soldered or otherwise rigidly secured to the top piece 290. Teeth 245 on the top piece 290 are provided so that the two split end sections 239 of the springs make rubbing contacts with the left-hand surfaces of such teeth. A lug 236 on the left end of top piece 290 extends through a hole in spring 234 which acts as a support for the piece 290. The hole in spring 234 is large enough to prevent buckling of springs 234 and 289 when the top piece 290 is moved to the left. Spring 235, separated by an insulator 247 is mounted next to spring 289 after which the springs 251, 252, 253, 243, etc., separated by insulators 247, are mounted. The spring 234, separated by insulator 247, is mounted next to spring 269. A metal plate 237 is mounted to the left of the last insulator 247 and together with the screws 238 holds the assembly to bar 122. Due to this spring assembly a large number of multiple circuits can be closed simultaneously with a small spring assembly. In addition, due to the rubbing action of the slotted ends 239 of the springs on teeth 245, a good contact is ensured as well as continuously being cleaned by the rubbing action. The contact spring assemblies shown in Fig. 3 are similar to the contact spring assembly shown in Figs. 5 and 7, there being an upper set mounted on bar 118 in the same manner as shown for mounting the set of Fig. 5 to bar 122. These upper and lower sets of contact springs are alternately spaced as shown in Fig. 2.

Fig. 9 shows a portion of the perforated tape for controlling the translator to operate an electric sign. The tape has perforation spaces for six perforations in each vertical column. As shown in the drawings, the first perforation is a start perforation for controlling the mechanism of the translator to operate the push bar which controls the start spring assembly 243 and 244 shown in Fig. 10. The succeeding perforations designates the letters SIGNS followed by a stop perforation indicating the end of a word. Each combination of perforations in the vertical columns controls the selections of the corresponding push bars so that the proper spring assemblies are operated by the translator. As shown, about ten or more spaces are left between words after which a start perforation precedes the next word perforations, in this case the word DISPLAY.

Fig. 10 shows the start and stop push bars 111 with their associated spring and circuit connections. Only two other push bars have been shown which correspond to the characters A and L with their associated spring and circuit connections. The remaining push bars corresponding to the remaining characters control spring combinations and circuit connections somewhat similar to the circuit connections controlled by the push bars for characters A and L. The two cams 8 and 9 on the cam shaft 7 are shown controlling the springs 140 and 141 and the circuits therefor. A start key SK and a stop key SP are shown for controlling relay 240 which in turn controls the stop magnet 25 of the translator. A motor and an electric centrifugal governor for controlling the translator is also shown and is connected for operation by the switch K.

Fig. 11 shows a sequence switch SQ having two sets of bank contacts and associated wipers 335 and 336 which are advanced a step in response to each deenergization of motor magnet 334. The restoring wiper 335 and associated multipled bank is provided for restoring the switch wipers 335 and 336 to normal position or the position shown. Wiper 336 is provided for successively operating the frame connecting relays individual to the successive sign frames. Lock relay 338 has a pair of contacts individual to each sign frame for controlling the locking circuits of the A. C. relays individual thereto. Transformer relay 339 has a pair of contacts individual to each sign frame for controlling the display circuit to the primary windings of the individual frame transformers T. Each sign frame has a power connecting relay, such as relays 351, 253, and 360 and a frame connecting relay, such as relays 371, 372, and 380, for connecting the 33 conductors extending from the translator spring assemblies to each sign frame. In this particular disclosure it is assumed that there are ten sign frames. Relays 351 and 371 are individual to the first sign frame and show the manner in which the control circuits are connected. Relays 352 and 372 are individual to the second sign frame and connect the control circuits to the second frame (shown dotted) in a similar manner. The connecting relays for sign frames 3, 4, 5, 6, 7, 8 and 9 are not shown, since the circuits they control are similar to the circuits controlled by the connecting relays for the first sign frame. The connecting relays 360 and 380 of the tenth sign frame are also shown. While only nine conductors are shown etxending from the character spring A and L in Fig. 10 it will be understood that in all there are 33 such conductors multipled and connected to the ten sign frames by the connecting relays, such as relays 371, 372, etc.

Fig. 12 shows the detail circuits of one sign frame, in this case the first one. Each sign frame is provided with a transformer, such as T, and with 33 A. C. relays of which only a portion has been shown. Each of these relays controls its own locking circuit and also controls normally closed contacts which in their closed positions normally short out a neon section of the character sign box shown in Fig. 13.

There are ten character sign boxes such as shown in Fig. 13. Each sign comprises a series of 33 neon tube sections connected in series as shown with the secondary of the transformer connected by conductors 346 and 345 to the two end sections numbered 1 and 33, respectively. The #1 neon section is normally short-circuited in the manner illustrated by conductors 437 and 438 and the upper contacts #1 A. C. relay. The remaining neon sections are shorted in a similar manner by contacts on correspondingly numbered relays. Only the sections which have had their short circuits removed by relay operation light when current is passed through the sign to form the different desired characters.

The mechanical operation of the tape translator will now be described in detail. In response to the closure of switch K the motor rotates the drive shaft 17 and gear 18 which meshes with gear 19 to rotate the clutch 20. Since the stop magnet 25 is not energized at this time, the pawl 22 is in the position shown in Fig. 4 with the result that cam shaft 7 does not at this time rotate.

After the tape is positioned under the cover 28 in the selection head assembly the start key SK (Fig. 10) may be pressed. In response to the operation of start key SK an obvious circuit is closed for energizing relay 240 which at its upper armature completes a locking circuit for itself from ground through the stop key SP. At its lower armature relay 240 completes the circuit for energizing stop magnet 25. Magnet 25 operates its armature 24 thereby releasing the pawl 22 and arm 23. Spring 22' causes the pawl 22 to engage in one of the teeth 21 of clutch 20, thereby causing the cam shaft 7 to rotate with clutch 20.

At the start of the selection position the feeler pins 69 are in their lower non-selecting position due to the roller 65 on cam follower 64 engaging the low surface of cam 10; the code bars 113 are held in non-operated position by code bar bail 83 due to the roller 85 on cam follower 84 engaging the high surface of cam 12; the pawl 43 is starting on its restoring stroke due to the roller 77 engaging the raising surface between the low and high surfaces of cam 11; the selector bars 112 are in their raised positions due to the selector bar bail 107 being in its raised position on account of the roller 99 on levers 97 engaging the high surface of cam 14, as shown in Fig. 7; the push bar bail 108 is in its forward operated position due to the roller 90 engaging the high surface on cam 13 and in case a push bar 111 has been selected by a previous selection such push bar will be in its operated position, as shown in Fig. 7; and the springs 140 and 141 are closed due to the insulating fibres 139 engaging the low surfaces on cams 8 and 9.

While the speed of rotation of cam shaft 7 may be varied due to adjustment of the governor it will be assumed, in order to clearly describe the timed operations, that cam shaft 7 completes one revolution every one hundred milliseconds. Now starting at selecting position as previously described, the time operation of the different parts will be given in millisecond periods. At the end of 15 milliseconds the fibres 139 engage the low surfaces of the cams 8 and 9 to close springs 140 and 141. At the end of 20 milliseconds the feeler pins 69 have been gradually raised to encounter the tape or to pass through a perforation therein due to the gradually raising surface of cam 10 raising the cam follower 64 and bail 126 as shown in Fig. 8. Only the feeler pins 69 which pass through perforations in the tape raises their individual latches 70 by means of the lugs in the feeler pins. Between the 20 and 30 millisecond periods the code bar cam 12 is lowering the cam follower 84 and bail 83, as shown in Fig. 8, so that at the end of 30 milliseconds those code bars 113, having their individual latches 70 removed from the notches 131 by their associated feeler pins passing through perforations, are free to be moved to the right by their individual springs 133. Latches 70 which have not been raised by their associated feeler pins 60 now hold the corresponding code bars 113 from longitudinal movement to the right. During the next 20 milliseconds, or between the 30 and 50 millisecond periods, the feeler pins 69 are lowered by roller 65 engaging the sloping surface of cam 10, thereby causing the bail 126 to engage the notches 129 in the feeler pins 69 and gradually lower the pins. The feeler pins 69 remain in their lower positions until the start of the next revolution of cam shaft 7. The code bars are held in operated position until about the 80 millisecond period at which time the code bar bail 83 is operated by cam 12 to restore the code bars 113. When the code bars 113 are fully restored the operated latches 70, which have been resting on the upper edges of their corresponding code bars 113, now fall into the notches 131 in readiness for the next selection. Between the 20 and 40 millisecond periods cam 13 is gradually returning the push bar bail 108 to its unoperated position as shown in Fig. 5. At approximately the 30 millisecond period the bail 108 is restored a sufficient distance to release the operated push bar 111 so that its individual spring 116 will restore the push bar 111 to the position shown in Fig. 5 against the lug 112' on the associated selector bar 112. Starting at approximately the 35 millisecond period the selector bar bail 107 is gradually lowered by cam 14 and reaches its lowermost position as shown in Fig. 6 at about the 50 millisecond period. The lugs 112' on the selector bars 112 cause their corresponding push-bars 111 to be lowered with the selector bars. Since the code bars 113 are operated at this time certain notches in all the code bars are in alinement with the result that one of the selector bars 112 enters into these alined notches and in so doing lowers the curved end of its associated push bar 111 so that the notch therein is in the path of the oscillating push bar bail 108. The remaining selector bars 112 which have not dropped into the alined notches in the code bars 113 are resting on the upper edges of such code bars and therefore do not lower their associated push bars in the path of the oscillating bail 108. Due to the curvature of cam 14 the bail 108 is started in its forward oscillating movement at about the 50 millisecond period. At approximately the 60 millisecond period, the point on the push bar bail 108 enters the triangular notch on the selected or lowered push bar 111 and thereafter pushes the push bar to the left as shown in Fig. 7 to operate the spring assembly shown. This selected push bar is now held operated by bail 108 until the 30 millisecond period is reached on the next rotation of cam shaft 7.

The selector bar bail 107 is maintained in its lowermost position until the 60 millisecond period is reached at which time the cam 14 raises the bail 107 and selector bars 112. The bail is held in raised position until about the 35 millisecond period on the next rotation of cam shaft 7. It should be noted that the push bars 111 at no time are lowered low enough to engage the code bars 113 and therefore the code bars 113 may be restored and reset without interference while the selected push bars 111 are operated.

The tape feed cam 11 operates pawl 43 in its upward stroke at approximately the 80 millisecond period thereby rotating the star wheel 36 to position the tape for the next selection. Springs 140 are held open by cam 8 from the 15th to the 45th millisecond period and springs 141 are held open by cam 9 from the 15th to the 75th millisecond period.

The translator operates in the manner described until the stop key SP is operated to open the locking circuit of relay 240, which, upon deenergizing, opens the circuit of stop magnet 25. Magnet 25, upon deenergizing, releases its armature 24 in the path of the pawl 26 and arm 23, thereby causing the pawl 22 to be disengaged from the teeth 21 of clutch 20. Arm 23 prevents further rotation of cam shaft 7.

From the foregoing it can therefore be seen that the greater part of a cycle period of operation is used in the selection of the proper push bar which does not interfere with the operated condition of the previously selected push bar which is held operated for a time equal to a greater part of a single cycle period of operation. It can also be seen that just as soon as one of the push bars is held operated by the push bar bail the selector bars, code bars, and all other selecting mechanisms may be restored and reset for a new selection without interfering with the then operated push bar.

Having described the mechanical operations of the tape translator a description will now be given of the manner in which the sign circuits are operated to display words and other characters. The tape, such as shown in Fig. 9, is advanced one step for each cycle period of operation or revolution as previously described. Since the first perforation encountered by the feeler pins of the translator is a start perforation, as shown in Fig. 9, the #1 feeler pin 69 is raised to operate its associated code bar latch 70, thereby allowing the #1 code bar 113 to move longitudinally when bail 83 operates. The movement of this code bar alines certain notches 132 in all the code bars #1 to #6, inclusive, to allow only the #36 selector bar 112 and its associated start or #36 push bar 111 to be selected. When the selector bar bail 107 is lowered only the #36 selector bar 112 enters the alined notches 132.

For convenience in describing the operation it will be assumed that the feeler pins 69 and code bars 113 shown in Fig. 2 are designated consecutively #1 to #6, from top to bottom, and that the selector bars 112 and their associated push bars 111 are designated consecutively #1 to #38 from left to right.

Push bar bail 108 now operates in the manner set forth to operate the #36 push bar 111, thereby operating springs 243 and 244, shown in Fig. 10. At springs 243 and its break contact, ground is disconnected from conductor 297 and at the make contact of spring 243 ground is connected to conductor 291 to energize control relay 340 and transformer relay 339 by way of switch 337 in flash position. In response to the closure of springs 244 ground is connected to conductor 293 to prepare a circuit for energizing lock relay 338 as soon as relay 340 closes its armature 343. Relay 340, upon energizing, at armature 341 and its resting contact opens the circuit extending to wiper 335 and at its working contact prepares a point in the circuit for motor magnet 334. At armature 342 relay 340 prepares another point in the circuit for motor magnet 334, at armature 343 connects the grounded conductor 293 to the winding of lock relay 338 for energizing the latter relay, and at armature 344 completes a locking circuit for itself as well as completing a circuit for maintaining relay 339 in energized position as follows: from ground by way of springs 242 and its break contact, conductor 292, armature 344, through the winding of 340 to battery, and over another branch including switch 337 in flash position and through the winding of transformer relay 339 to battery. Transformer relay 339, upon energizing, operates its ten armatures, one for each sign frame, to disconnect one terminal of the A. C. source from the ten conductors 461, 462 ... 470. In case some word was on display at the time relay 339 is operated the operation of this relay at its armature disconnects the A. C. source from the sign frame to wipe out the display. Relay 338, upon energizing, operates its ten armatures to disconnect one terminal of the A. C. source from the ten conductors 451, 452 ... 460 to unlock any A. C. relay which may at this time be energized.

During the time the start push bar #36 is being selected, or between the 15th and 45th millisecond period, as previously described, springs 140 are opened by cam 8 and are reclosed shortly before the push bar bail 108 engages and operates the selected start push bar #36. Springs 141, which have been operated by cam 9 during the selecting period, are reclosed at about the time that the selector bar bail 107 reaches its highest position, or approximately at the 75 millisecond period. As previously described, the push bar 111, in this case push bar #36, is held operated until about the 30 millisecond period of the next cycle of operation, or revolution, at which time it is released from the push bar bail 108. This is at a time when the feeler pins 69 have been operated for the succeeding selection. The release of start push bar #36 also releases the springs 243 and 244. The restoration of springs 244 opens the circuit of lock relay 338 which thereupon deenergizes to connect one side of the source of A. C. current to conductors 451, 452, ... 460. The restoration of springs 243 at its make contact opens the original energizing circuit of relays 340 and 339, which relays, however, are maintained energized over grounded conductor 292 as previously described. At the break contact of spring 243 the following circuit is completed for motor magnet 334 when springs 140 are again closed. From grounded spring 243 and its break contact, springs 241, conductor 297, armature 341 and working contact, conductor 296, springs 140 now closed by cam 8, conductor 294, and through the winding of motor magnet 334 to battery. A branch of this circuit may be traced for energizing frame connecting relay 371 as follows: from ground at spring 243 over the previously traced circuit to conductor 294 and thence by way of armature 342, wiper 336 in engagement with its first bank contact, and through the winding of relay 371 to battery. Motor magnet 334, upon energizing, positions its pawl preparatory to stepping the wipers of the switch SQ and near the end of its stroke operates its interrupter springs shown to the right thereof. Frame connecting relay 371, upon energizing, connects the thirty-three common conductors 201 to 233, inclusive, to the thirty-three A. C. relays 1 to 33, in Fig. 12, by way of armatures 301 to 333, inclusive, and conductors 401 to 433, inclusive.

Assuming now that character A push bar, or in this case push bar #1, has been selected, as previously described, during the second revolution, and the push bar bail at approximately the 60 millisecond period in the second revolution operates its associated spring combination to prepare circuits for the A. C. relays in the first sign frame shown in Fig. 12. About the 75 millisecond period of the second revolution springs 141 are closed by cam 9 to close circuits through the character A springs for the A. C. relays in the first sign frame. In this particular case in order to form the letter A, A. C. relays 8, 30 and 31 are energized in Fig. 12. The circuit for energizing A. C. relay 8 in Fig. 12 may be traced as follows: from one terminal of the A. C. source through springs 141 now closed, conductor 248, spring 249, top piece 250, springs 258, conductor 208, armature 308, through the winding of relay 8, conductor 298, through switch K to the other terminal of the A. C. source. The circuit for energizing A. C. relay 30 in Fig. 12 may be traced from conductor 248, spring 249, top piece 250, springs 280, conductor 230, spring 330, conductor 430, through the windings of relay 30 in Fig. 12, to conductor 298 and the other terminal of the A. C. source. The circuit for energizing A. C. relay 31 in Fig. 12 may be traced as follows: from one terminal of the A. C. source, over the previously traced circuit to top piece 250 and from thence by way of spring 281, conductor 231, armature 331, conductor 431, through the winding of A. C. relay 31 to conductor 298 and the other terminal of the A. C. source. Relays 8, 30, and 31 energize over the above traced circuit and at their lower armatures complete locking circuits for themselves by way of conductor 451 through the normally closed armature on relay 338, which at this time is deenergized in response to the restoration of the start push bar #36. At the upper armatures of relays 8, 30, and 31 the short circuits from around the neon tube section 8, 30 and 31 are removed. At about the 80 millisecond period the tape is stepped for the next selection and at the 15th millisecond period on the third revolution springs 141 and spring 140 are opened by cams 8 and 9. At springs 141 the original energizing circuit of relays 8, 30 and 31 are opened but these relays are now held energized over their locking circuits. Springs 140 open the circuit of motor magnet 334 and relay 371 with the result that motor magnet 334 and relay 371 deenergize. The deenergization of frame connecting relay 371 disconnects the common conductors 201 to 233, inclusive, from the first sign frame. The deenergization of motor magnet 334 releases the positioned pawl to cause the wipers of the switch SQ to be stepped into engagement with their second bank contacts.

In the same manner as described, the character perforations for the second letter, assuming it to be the character L, cause the selection of the #23 push bar during the third revolution. When spring 140 again close, the circuit to the motor magnet 334 is again completed, and in this case a circuit is likewise completed for the second frame connecting relay 373 as follows: from grounded springs 243 and its break contact, springs 241, conductor 297, armature 341 and working contact, conductor 296, springs 140, conductor 294, armature 342, wipers 336 in engagement with its second bank contact, and through the winding of the second frame connecting relay 372 to battery. Motor magnet 334 likewise energizes from ground on conductor 294 with the result that the stepping pawl is again positioned preparatory to stepping the wipers 335 and 336. At the upper armatures of relay 372 the common conductors 201 to 233, inclusive, are connected to the A. C. relays in the second sign frame. Relay 372 at its lower armature completes a circuit for energizing the power connecting relay 351 individual to the first sign frame, as follows: from one terminal of the A. C. source, through the lower armature of relay 372, through the winding of relay 351, conductor 298, switch K to the other terminal of the A. C. source. At its upper armature relay 351 completes a locking circuit for itself over conductor 451 and through the normally closed armature on relay 338 to the A. C. source. At its lower armature relay 351 prepares a circuit for connecting the A. C. source to the lower terminal of the primary winding of the transformer T in Fig. 12.

When springs 141 again close circuits are completed for energizing the A. C. relays in the second frame, or the relays 1, 2, 3, 4, 18, and 19 therein. The circuit for the #1 A. C. relay in the second frame may be traced as follows: from one terminal of the A. C. source through springs 141, conductor 248, spring 289, top piece 290, spring 251, conductor 201, the upper armature of relay 372 and over a conductor similar to conductor 401 to the #1 A. C. relays in the second frame, and thence by way of conductor 298 through the key K to the other terminal of the A. C. source. The A. C. relay 2 in the second frame is energized over similar circuits extending from top piece 299 by way of spring 252 and conductor 202. In a similar manner A. C. relays 3, 4, 18 and 19 in the second sign frame are energized over circuits controlled by springs 253, 254, 268, and 269. The operated A. C. relays in the second frame lock energized over their lower armatures over conductor 452, through the second normally closed spring on relay 338 to the A. C. source. When springs 140 and 141 again open, at approximately the 15 millisecond period in the fourth revolution, the A. C. relays in the second frame are maintained energized over their locking circuit when relay 372 deenergizes in response to the opening of springs 140. The operated A. C. relays in the second frame at their upper armatures remove the correspondingly numbered short circuits from around their neon tube sections to prepare the neon sign to display the letter L, in a manner similar to that described for the letter A.

Motor magnet 334 deenergizes in response to the opening of springs 140 to step the wipers 335 and 336 of the switch SQ into engagement with their third bank contacts.

In the same manner as just described the remaining letters of the word are prepared for display in each succeeding sign frame until the stop perforation in the tape indicates the end of the word. When springs 140 close on the stop revolution, the corresponding frame connecting relay, such as relay 372 or 380, dependent upon the position of wiper 336, is energized to in turn energize the preceding power connecting relays, such as relays 352 or 360. The lower connecting relay then locks in the manner similar to that previously described and prepares the lower circuit to the transformer of its associated sign frame through its lower armature, as previously described. In case all of the sign frames are to be used for a word, then relay 381 is energized in response to the stop revolution to operate power relay 362 individual to the last sign frame.

When the stop push bar #38 is operated by bail 108 springs 241 and 242 are operated. At springs 242 and its break contact the locking circuits of relays 339 and 340 are opened with the result that these relays now deenergize.

At springs 241 the circuits of the motor magnet 334 and the last operated frame connecting relay is opened, but the closure of springs 242 at its make contact maintains the last operated frame connecting relay in operated position in response to the grounding of conductor 295. Relay 340, upon deenergizing, at armature 341 prepares a circuit for restoring the wipers of switch SQ to normal position; at armature 342 disconnects motor magnet 334 from grounded conductor 295, thereby deenergizing the magnet; at armature 343 opens a point in the circuit for relay 338, and at armature 344 opens a point in its own locking circuit and the circuit of relay 339. Relay 339, upon deenergizing, at its righthand springs connects one terminal of the A. C. source to the lower terminals of the primary windings of transformers T in each sign frame by way of the lower armatures of the operated power connecting relays to cause the display of the word set up. The circuit for the primary winding of transformer T in the first sign frame is as follows: from one terminal of the A. C. source, through the left-hand normally closed springs of relay 339, conductor 461, lower armature of A. C. relay 351, conductor 481, through the primary winding of the transformer T to conductor 298, and thence by way of key K to the other terminal of the A. C. source. A similar circuit for the primary winding of the transformer in the second sign frame is as follows: from one terminal of the A. C. source, through the second armature of relay 339, conductor 462, lower armature of the A. C. power connecting relay 352, over a conductor similar to conductor 481, through the primary winding of the transformer in the second sign frame to conductor 298, and thence through the key K to the other terminal of the A. C. source. In a similar manner the circuits for the transformers in the sign frames having their individual power connecting relays operated are completed through the armatures of relay 339.

Since the A. C. relays 8, 30 and 31 in the first sign frame shown in Fig. 12 are energized at this time, a circuit is completed through the secondary winding of transformer T for illuminating the neon sections 8, 30 and 31 to display the letter A on this sign frame as follows: from the lower terminal of the secondary winding of transformer T, conductor 436, over the short circuit including a conductor 438, the upper armature of #1 A. C. relay, conductor 437, to the upper terminal of the #1 neon section, thereby shorting the section. The circuit continues from the upper terminal of the #1 neon section over a similar short circuit including the normally closed armature on the #2 A. C. relay. Neon sections 3, 4, 5, 6, and 7 are short circuited in a similar manner by the upper armatures of the correspondingly numbered relays. The circuit continues from the lower left-hand terminal of neon tube sections 8, and in this case, since the #8 A. C. relay is energized, the short circuit around the #8 sections is removed with the result that these sections are included in the display circuit. The circuit continues from the lower right-hand terminal of section 8 over similarly described short circuits of sections 9 to 29, inclusive. Since A. C. relays 30 and 31 are energized then the short circuits around sections 30 and 31 are removed with the result that these sections 30 and 31 are included in the display circuit. The circuit continues from the right-hand terminal of section 31 over the similarly described short circuits of sections 32 and 33 over conductor 435 and thence to the upper terminal of transformer T for completing the display circuit. Only neon tube sections, 8, 30, and 31 of the first sign frame are illuminated while the remaining sections are dark with the result that the letter A is displayed in the first sign frame. The neon tube sections in the second sign frame are illuminated in a similar manner to display the letter L since the A. C. relays 1, 2, 3, 4, 18 and 19 have been energized to remove the short circuits from the corresponding neon sections. In a similar manner the remaining sign frames are illuminated to display the letter corresponding to the combination of individually operated A. C. relays in such sign frames.

In order to show how all the different characters are to be displayed on the sign the following chart has been prepared which shows in the first vertical column the character selected for display. The second vertical column indicates the coded perforations in the tape in Fig. 9, and the corresponding code bars actuated for such characters. The third vertical column indicates the particular selector bar and its associated push bar which are actuated for a given character. The fourth column indicates the A. C. relays, such as shown in Fig. 12, which are operated to remove the short circuits from the corresponding neon sections to cause the display of the corresponding character shown in the first vertical column.

| Character | Code and code bars actuated | Selector bar actuated | Relays in sign frame operated |
|---|---|---|---|
| A | 5 | 1 | 8 30 31 |
| B | 1 2 4 | 3 | 1 2 3 4 12 19 22 23 25 26 29 30 |
| C | 2 6 | 5 | 2 3 20 23 26 27 |
| D | 2 3 | 7 | 1 2 3 4 12 15 16 19 23 26 |
| E | 3 | 9 | 1 2 3 4 12 13 18 19 29 30 31 |
| F | 3 5 | 11 | 1 2 3 4 12 13 29 30 31 |
| G | 5 6 | 13 | 2 3 16 20 23 26 27 31 32 |
| H | 1 5 | 15 | 1 2 3 4 14 15 16 17 29 30 31 32 |
| I | 6 | 17 | 24 33 |
| J | 1 2 6 | 19 | 14 15 16 20 23 |
| K | 1 2 5 | 21 | 1 2 3 4 6 9 10 29 30 |
| L | 2 4 | 23 | 1 2 3 4 18 19 |
| M | 3 4 | 25 | 1 2 3 4 6 11 14 15 16 17 |
| N | 1 4 | 27 | 1 2 3 4 9 10 11 14 15 16 17 |
| O | 1 3 | 29 | 2 3 15 16 20 23 26 27 |
| P | 4 6 | 31 | 1 2 3 4 12 25 26 29 30 |
| Q | 1 3 4 | 33 | 2 3 9 15 16 20 23 26 27 |
| R | 1 6 | 35 | 1 2 3 4 9 10 12 25 26 29 30 |
| S | 1 2 | 37 | 20 22 23 26 27 28 |
| T | 4 | 2 | 12 13 24 33 |
| U | 2 5 | 4 | 2 3 4 14 15 16 20 23 |
| V | 1 2 3 | 6 | 5 |
| W | 3 6 | 8 | 1 2 3 4 7 9 10 14 15 16 17 |
| X | 1 3 5 | 10 | 6 7 9 10 11 |
| Y | 4 5 | 12 | 6 11 24 |
| Z | 1 3 6 | 14 | 6 7 12 13 18 19 |
| 1 | 6 | 17 | 24 33 |
| 2 | 1 4 5 | 16 | 1 18 19 21 25 26 27 |
| 3 | 1 4 6 | 18 | 20 22 23 25 26 27 30 |
| 4 | 1 5 6 | 20 | 3 4 24 29 30 31 32 33 |
| 5 | 2 3 4 | 22 | 3 4 12 13 20 22 23 29 30 |
| 6 | 2 3 5 | 24 | 2 3 20 21 22 23 26 27 |
| 7 | 2 3 6 | 26 | 6 7 12 13 |
| 8 | 2 4 5 | 28 | 20 21 22 23 25 26 27 28 |
| 9 | 2 4 6 | 30 | 15 16 20 23 25 26 27 28 |
| 0 | 1 3 | 29 | 2 3 15 16 20 23 26 27 |
| — | 3 4 5 | 32 | 29 30 31 32 |
| $ | 3 4 6 | 34 | 20 22 23 24 26 27 28 33 |
| Start | 1 | 36 | |
| Stop | 2 | 38 | |

When stop push bar #38 is restored springs 241 and 242 also restore. Spring 242 at its make contact opens the circuit to the last operated frame connecting relay, such as relay 372 or 380. The closure of springs 241 completes a circuit for energizing the motor magnet 334 as follows: from grounded spring 243 and its break contact, springs 241, conductor 297, armature 341 and resting contact, wiper 335 in engagement with one of its multiple bank contacts, through the interrupter springs of motor magnet 334, and through the winding of magnet 334 to battery. Motor magnet 334 energizes over the above traced circuit to position its pawl preparatory to stepping the wipers of the switch and near the end of its stroke operates its interrupter springs thereby opening its own circuit. Motor magnet 334 thereupon deenergizes and steps the wipers 335 and 336 into engagement with their next bank contact and also closes its interrupter springs. The same circuit for energizing motor magnet 334 is completed as long as wipe 335 engages the multiple bank contacts, with the result that motor magnet 334 operates intermittently to step the wipers until wiper 335 engages its first bank contact at which point the circuit to motor magnet 334 is opened. Wipers 335 and 336 are double-ended wipers which, upon stepping from their last bank contacts, engage their first bank contacts.

The tape translator continues to step the tape one step per revolution, and since a number of blank spaces are provided between word perforations, the illuminated word will be displayed until such time as the start push bar #36 is again operated at the start of the next word. As previously described the operation of springs 243 completes the circuit for relay 339 which thereupon energizes and disconnects the A. C. source from the lower terminal of the primary windings of the transformers, thereby wiping out the display. The operation of springs 244 again causes the energization of lock relay 338 which opens the locking circuits of the operated A. C. relays individual to the sign frames. The A. C. relays now deenergize and are in position to be operated in preparation for the next display. The next word is set up and displayed in the manner just described. Having described how a full word is displayed at a given time when the switch 337, Fig. 11, is in its flash position, a brief description will be given of the circuit operations when the successive letters of a word are successively displayed on successive sign frames when the switch 337 has been operated to spell position. Assuming now that switch 337 is in spell position, then no circuit is completed for relay 339 when the start springs 243 are operated by start push bar #36. In this case, since relay 339 is not energized, the letter for the first sign frame is displayed in response to the operation of relay 372 which at its lower armature completes the circuit for the A. C. power connecting relay 351 of the first sign frame, it being remembered that relay 372 energized during the revolution which selects the second letter of the word. In a similar manner each succeeding frame connecting relay operates the preceding power connecting relay in the same manner as relay 372 operates the A. C. power connecting relay 351. Each power connecting relay renders its associated transformer active to cause the illumination of a letter corresponding to the operated A. C. relays in its sign frame. After the letters are illuminated the same are maintained in this condition until relay 338 is energized at the start of the next word selection, whereupon the operated A. C. relays individual to the sign frame deenergize in the manner previously described. In order to stop the mechanical operations of the translator the stop key SP is operated to open the locking circuit of relay 240 which in turn opens the circuit of the stop magnet 25. The stop magnet 25, upon deenergizing, restores stop armature 24 in the path of the rotating arm 23 and pawl 22 with the result that the pawl is withdrawn from teeth 21 of clutch 20 when the pawl strikes the stop armature 24. Further rotation of the cam shaft 7 is now prevented by the engagement of the arm 23 on top of the stop armature 24. In order to stop the motor, switch K is operated to the position shown in Fig. 10.

This tape translator may be used wherever translation is required from a perforated tape. For example, the electric sign circuits shown in application Ser. No. 634,139 of M. L. Nelson filed September 21, 1932 may be controlled by this tape translator. In this example the push bars of the translator would operate springs connected in multiple with the springs controlled by the character keys shown in Fig. 3. In this case no start perforation is used in the tape because none is needed. A display perforation and display push bar, however, are needed, and this perforation and push bar would correspond to the stop perforation and stop push bar in the instant application. The push bar of the translator may also operate bell crank levers which in turn operate the keys of a typewriter or other recording machines.

Having described the invention what is considered to be new is pointed out in the appended claims.

What is claimed is:

1. In a display system, the combination of start, character, and stop contact spring assemblies, of a plurality of sign frames for displaying characters, means for selecting successive sign frames in response to a single operation and release of said start contact spring assembly and the successive operations of said character contact spring assemblies, circuits prepared in the successive sign frames responsive to the successive operations of said character contact spring assemblies, means responsive to the operation of said stop contact spring assembly for energizing said prepared circuits, means in said sign frames responsive to the combination of said energized circuits for displaying the characters of the word corresponding to the operated character contact spring assemblies, and means responsive to a reoperation and release of said start spring contact assembly for extinguishing said display.

2. In a display system, the combination of start and character contact spring assemblies, of a plurality of sign frames for displaying characters, means for selecting successive sign frames in response to an operation of said start contact spring assembly and the successive operations of said character contact spring assemblies, circuits prepared in the successive sign frames responsive to the successive operations of said character contact spring assemblies, means responsive to each successive selection of a succeeding sign frame for energizing the prepared circuits of the preceding sign frame, means in each sign frame responsive to the energization of said prepared circuits for displaying the character corresponding to the operated character contact spring assemblies, and means responsive to a reoperation of said start spring contact assembly for extinguishing said display.

3. In a display system, a neon sign comprising a plurality of letter boxes, each letter box comprising a plurality of sections connected in series for outlining characters, a normally closed short-circuit around each said section, a power transformer for each letter box including primary and secondary windings, a circuit for each primary winding, an illuminating circuit for each letter box including its associate secondary winding and the short-circuits or sections in series, a sign relay for each section for controlling the corresponding short circuits, a circuit for each sign relay, a common locking circuit for maintaining each sign relay in operated position after operation, a power connecting relay for each letter box, a set of conductors common to all the letter boxes, means for transmitting successive character codes, means responsive to the successive transmitted codes for temporarily connecting said set of common conductors to the sign relays in successive letter boxes to prepare their circuits, means responsive to the successive transmitted character codes for completing only the sign relay circuits over said set of common conductors in the successive letter boxes corresponding to the successive transmitted character codes thereby operating and locking the corresponding sign relays to open the short-circuits around the corresponding sections, means for operating and locking each successive power connecting relay to prepare the circuit to the primary winding of each letter box in response to each subsequent connection of said sets of common conductors to a subsequent letter box, and means for completing the primary circuits thereby supplying current to each letter box illuminating circuit by way of the secondary windings to illuminate the said sections having their short circuits opened.

4. In a display system, the combination of start, character, and stop contact spring assemblies, of a plurality of sign frames for displaying characters, a normally closed locking circuit individual to each sign frame, a power connecting circuit individual to each sign frame, means for operating and restoring said start contact spring assembly, certain of the character contact spring assemblies, and said stop contact spring assembly, a power relay operated in response to the operation of said start contact spring assembly for opening all said individual power connecting circuits, a control relay operated in response to the operation of said start contact spring assembly for locking itself and said power relay in operated position over a circuit including said stop contact spring assembly, a locking relay operated in response to the operation of said control relay for opening all said normally closed individual locking circuits and restored in response to the restoration of said start contact spring assembly to reestablish said normally closed individual locking circuits, a set of conductors common to said sign frames and connected to said character contact spring assemblies in accordance with the character such spring assemblies correspond to, a plurality of neon tube sections in each sign frame connected in a series circuit for forming characters, a normally closed short-circuit around each section, a sign relay individual to each section for controlling the associated short-circuit, said sign relay at each sign frame corresponding to a particular one of said conductors, means including a sequence switch for connecting said conductors to corresponding sign relays in successive sign frames in response to successive actuations of said character contact spring assemblies, means for operating the sign relays in successive sign frames over said conductors in response to and in accordance with the successive character contact spring actuations, the operated sign relays locking over said character contact locking circuit and opening the associated short-circuit around the corresponding sections, means responsive to the operation of said stop contact spring assembly for restoring said control and power connecting relays to complete said power connecting circuits for each sign frame, and means including said series circuits in each sign frame responsive to the completion of said power circuits for illuminating the sections having their short-circuits opened by their individual sign relays to display the characters corresponding to the actuated character contact spring assemblies.

5. In a display system, the combination of start, character, and stop contact spring assemblies, a plurality of sign frames for displaying characters, means for operating and restoring said start contact spring assembly, the corresponding character contact spring assemblies and said stop contact spring assembly, a set of conductors common to said sign frames and connected to said character contact spring assemblies in accordance with the characters such spring assemblies correspond to, a plurality of neon tube sections in each sign frame for forming characters, a series circuit in each sign frame normally connecting all such sections in series, a normally closed short-circuit around each section, a sign relay individual to each section for controlling the associated short-circuit, each sign relay at each sign frame corresponding to a particular one of said conductors, means for connecting said conductors to corresponding sign relays in successive sign frames in response to the operation and restoration of said start contact spring assembly and successive actuations of said character contact spring assemblies, means for operating the sign relays in successive sign frames over said conductors in response to and in accordance with the successive character contact spring actuations to open the associated short-circuits around the corresponding sections, means including said series circuits responsive to the operation of said stop contact spring assembly for illuminating the sections having their short-circuits opened by their individual operated sign relays to display the characters corresponding to the actuated character contact spring assemblies, and means thereafter responsive to a reoperation and restoration of said start contact spring assembly for extinguishing said display and for restoring said operated sign relays.

6. In a display system, the combination of start, character, and stop contact spring assemblies, of a plurality of sign frames for displaying characters and a step-by-step sequence switch having a normal position, means responsive to a single operation and release of said start contact spring assembly for conditioning said sequence switch for operation, means operated in combination with successive operations of said character contact spring assemblies for operating said sequence switch step by step from normal position to select a successive sign frame on each step from normal position, circuits prepared in the successive sign frames responsive to the successive operations of said character contact spring assemblies, means responsive to the operation of said stop contact spring assembly for energizing said prepared circuits, means in said sign frame responsive to said prepared energized circuits for displaying the characters corresponding to the actuated character contact spring assemblies, and means responsive to a reoperation and release of said start contact spring assembly for returning said sequence switch to its normal position in condition for reoperation and for extinguishing said display by deenergizing said energized prepared circuits to normal condition.

MARTIN L. NELSON.
LEITH JOHNSTON.